(12) United States Patent
Yoo

(10) Patent No.: US 10,988,985 B2
(45) Date of Patent: Apr. 27, 2021

(54) LADDER

(71) Applicant: Thomas Yoo, Garden Grove, CA (US)

(72) Inventor: Thomas Yoo, Garden Grove, CA (US)

(73) Assignees: Thomas Yoo, Garden Grove, CA (US); HYUNDAI ALUMINUM VINA SHAREHOLDING COMPANY, Hung Yen Province (VN)

( * ) Notice: Subject to any disclaimer, the term of this patent is extended or adjusted under 35 U.S.C. 154(b) by 215 days.

(21) Appl. No.: 16/017,586

(22) Filed: Jun. 25, 2018

(65) Prior Publication Data

US 2019/0390518 A1 Dec. 26, 2019

(51) Int. Cl.
| E06C 7/42 | (2006.01) |
| E06C 1/18 | (2006.01) |
| F16C 11/04 | (2006.01) |
| E06C 1/32 | (2006.01) |

(52) U.S. Cl.
CPC ............. *E06C 7/423* (2013.01); *E06C 1/18* (2013.01); *F16C 11/04* (2013.01); *E06C 1/32* (2013.01)

(58) Field of Classification Search
CPC ..... E06C 1/16; E06C 1/20; E06C 1/18; E06C 1/32; E06C 1/14; E06C 7/42; E06C 7/423; E06C 7/44; F16C 11/04; F16B 2/18; F16B 7/1454
See application file for complete search history.

(56) References Cited

U.S. PATENT DOCUMENTS

| 1,726,372 | A | * | 8/1929 | Stoll | A47C 3/26 |
| | | | | | 248/601 |
| 1,729,033 | A | * | 9/1929 | Czischke | E06C 7/44 |
| | | | | | 182/205 |
| 1,733,338 | A | * | 10/1929 | Enke | E06C 7/44 |
| | | | | | 182/204 |
| 2,339,593 | A | * | 1/1944 | Weston | E06C 1/20 |
| | | | | | 182/177 |
| 3,508,628 | A | * | 4/1970 | Conrad | E06C 7/423 |
| | | | | | 182/172 |
| 3,704,850 | A | * | 12/1972 | Hendrickson | A47B 9/20 |
| | | | | | 248/188.5 |
| 3,780,974 | A | * | 12/1973 | Takahashi | G03B 21/58 |
| | | | | | 248/411 |
| 4,147,231 | A | * | 4/1979 | Chantler | E06C 7/423 |
| | | | | | 182/107 |

(Continued)

*Primary Examiner* — Daniel P Cahn
*Assistant Examiner* — Shiref M Mekhaeil
(74) *Attorney, Agent, or Firm* — John K. Park; Park Law Firm

(57) ABSTRACT

A ladder stabilizer is provided, comprising an extension bar portion, a main arm portion, a brace bar portion, teeth strips, and levers. The extension bar portion is enclosed by an outer wall surface, an inner wall surface, and two side wall surfaces, and having upper and lower end portions. The main arm portion has upper and lower end portions configured for a telescopic connection. The brace bar portion has first and second end portions, and the first end portion is connected to the side portion at a lower position, and the second end portion is connected to the extension bar portion at a middle position. The teeth strips are fixed to lower portions of the two side wall surfaces of the main arm portion. Each lever has latching and releasing ends, installed on the two side wall surfaces of the extension bar through two spring-loaded hinges.

12 Claims, 11 Drawing Sheets

(56) References Cited

U.S. PATENT DOCUMENTS

| | | | | |
|---|---|---|---|---|
| 4,247,216 A * | 1/1981 | Pansini | B25G 3/18 | 15/1.7 |
| 4,519,477 A * | 5/1985 | Ralston | E06C 7/423 | 182/107 |
| 4,793,646 A * | 12/1988 | Michaud, Jr. | B63B 21/54 | 114/221 R |
| 4,798,262 A * | 1/1989 | Margolies | E06C 1/20 | 182/106 |
| 4,964,488 A * | 10/1990 | Stewart | E06C 1/20 | 182/107 |
| 5,011,136 A * | 4/1991 | Rennex | A63B 25/02 | 482/51 |
| 5,086,876 A * | 2/1992 | Severson | E06C 7/423 | 182/107 |
| 5,341,899 A * | 8/1994 | Casamento | E06C 7/003 | 182/107 |
| 5,375,938 A * | 12/1994 | Bartlow | B25G 1/04 | 15/144.4 |
| 5,417,503 A * | 5/1995 | Brennan, III | E04H 4/1609 | 401/92 |
| 5,526,898 A * | 6/1996 | Clark | E06C 7/44 | 182/108 |
| 5,678,656 A * | 10/1997 | Lanzafame | E06C 7/44 | 182/111 |
| 5,704,451 A * | 1/1998 | King | E06C 7/44 | 182/111 |
| 5,813,647 A * | 9/1998 | Chen | B61D 45/006 | 248/354.1 |
| 6,401,866 B1 * | 6/2002 | Roy | E06C 7/44 | 182/204 |
| 6,431,607 B1 * | 8/2002 | Kittelmann | A47L 9/244 | 285/7 |
| 6,851,652 B1 * | 2/2005 | Huang | E04G 25/06 | 248/200.1 |
| 7,097,380 B2 * | 8/2006 | Lee | F16B 7/105 | 15/80 |
| 7,278,436 B2 * | 10/2007 | Gale | A45B 7/00 | 135/67 |
| 7,574,768 B2 * | 8/2009 | Morris | B25G 3/28 | 15/143.1 |
| 8,365,865 B2 * | 2/2013 | Moss | E06C 7/00 | 182/172 |
| 8,414,460 B2 * | 4/2013 | Todokoro | F16B 7/0446 | 482/23 |
| 8,561,349 B2 * | 10/2013 | Flannery | E05B 65/0007 | 49/55 |
| 10,107,035 B1 * | 10/2018 | Lanzafame | E06C 7/10 | |
| 10,590,702 B2 * | 3/2020 | Major | E06C 7/423 | |
| 2001/0002086 A1 * | 5/2001 | Webb | B66C 23/80 | 280/765.1 |
| 2002/0064420 A1 * | 5/2002 | Lin | B25B 27/10 | 403/217 |
| 2004/0020582 A1 * | 2/2004 | Swiderski | B29C 37/0078 | 156/92 |
| 2004/0101351 A1 * | 5/2004 | Pitcher | F16B 7/1454 | 403/109.5 |
| 2004/0134714 A1 * | 7/2004 | Spengler | E06C 1/39 | 182/172 |
| 2005/0158118 A1 * | 7/2005 | Hsieh | F16B 7/105 | 403/379.2 |
| 2006/0133889 A1 * | 6/2006 | Warner | F16B 7/149 | 403/109.4 |
| 2007/0163839 A1 * | 7/2007 | Dangrow | E06C 7/44 | 182/204 |
| 2007/0234497 A1 * | 10/2007 | Lee | A47L 13/42 | 15/144.1 |
| 2009/0206226 A1 * | 8/2009 | Forrest | A47C 7/002 | 248/354.6 |
| 2010/0038172 A1 * | 2/2010 | Ralston | E06C 7/46 | 182/107 |
| 2010/0116592 A1 * | 5/2010 | Clements | E06C 7/44 | 182/180.1 |
| 2011/0236123 A1 * | 9/2011 | Melino, Sr. | F16B 7/1454 | 403/81 |
| 2017/0254145 A1 * | 9/2017 | Ballard | E06C 7/06 | |

\* cited by examiner

Fig. 9
Fig. 10
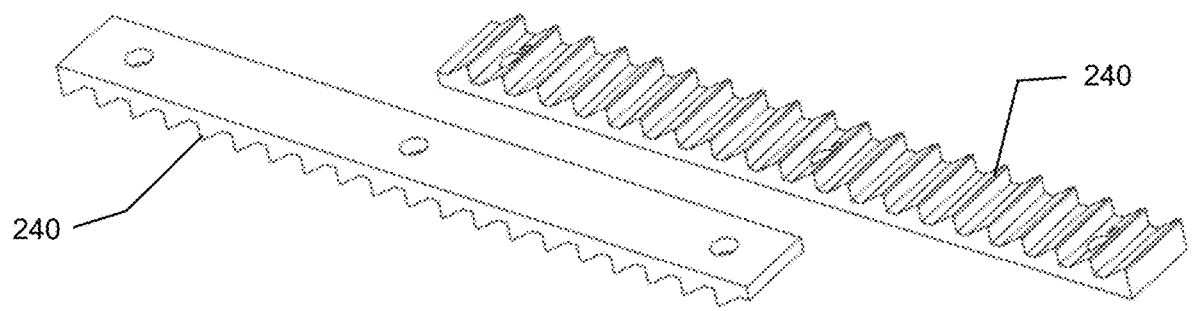
Fig. 11
Fig. 12
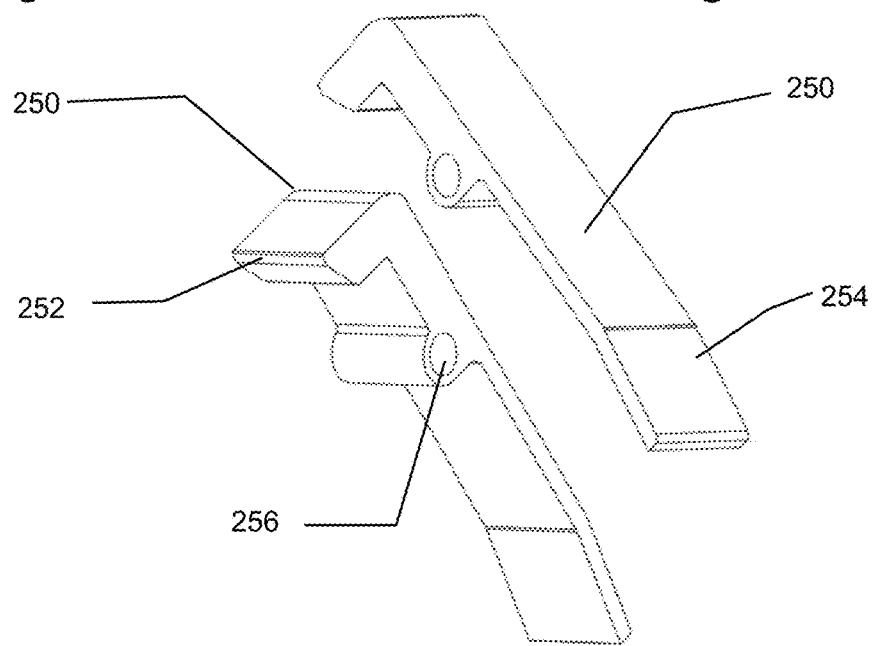

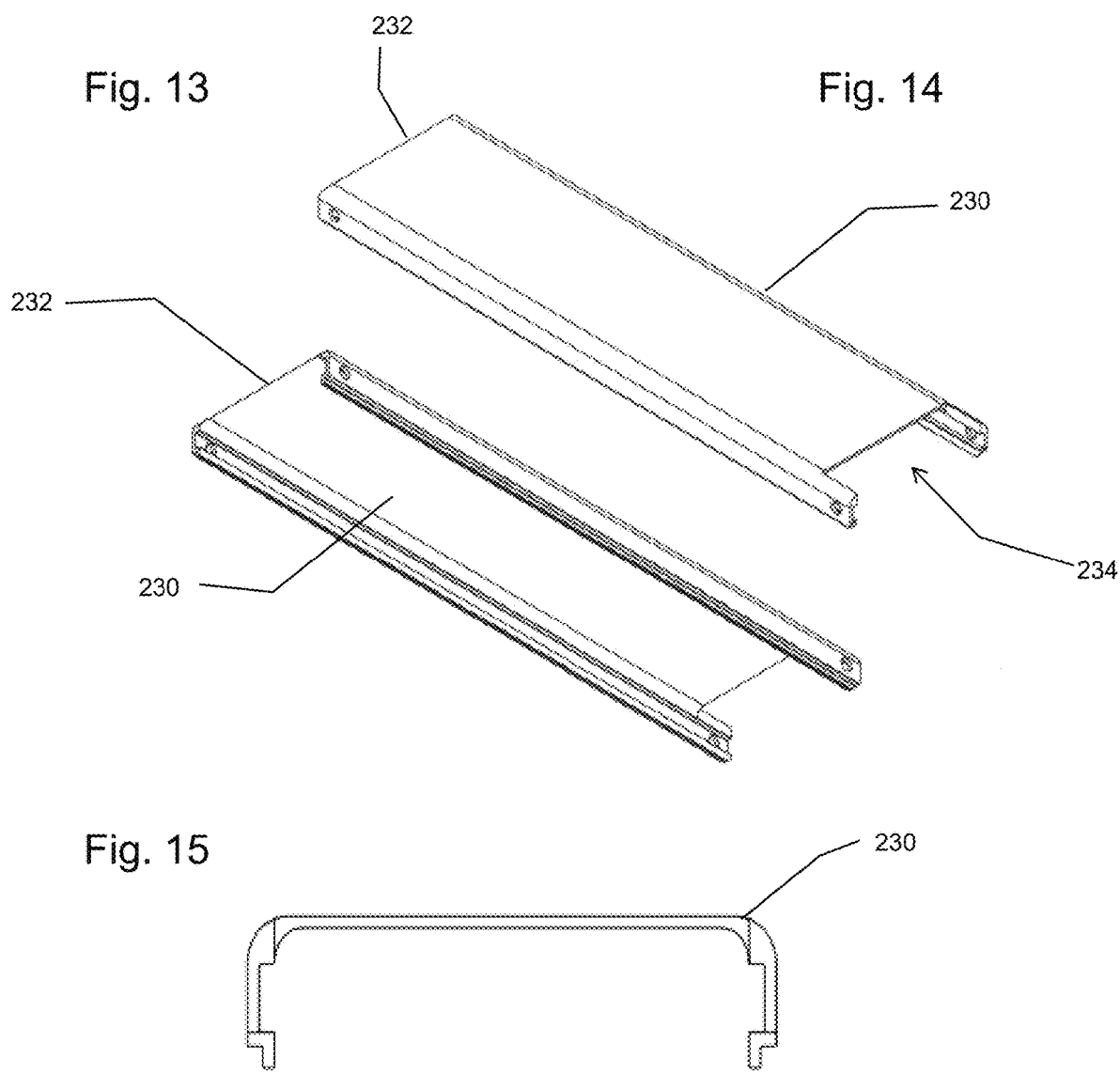

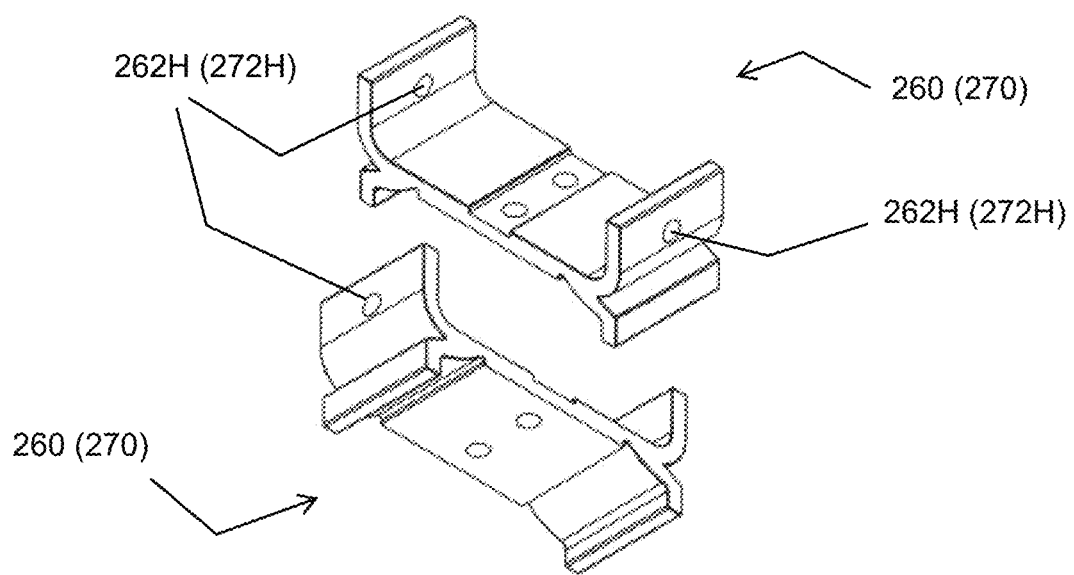
Fig. 16
Fig. 17
Fig. 18
Fig. 19

LADDER

BACKGROUND OF THE INVENTION

The present invention relates to a ladder with stabilizer.

Ladders are for reaching upwards and vertically, defying the gravity. As a natural consequence, there exists a danger of falling down from the heightened position made possible with a ladder.

Also, such a falling down may include being toppled over with the ladder, mainly due to unstable propping or narrow base of the ladder.

Therefore, there are several features to improve in the conventional ladders.

Accordingly, a need for a ladder with stabilizers has been present for a long time considering the expansive demands in the everyday life. This invention is directed to solve these problems and satisfy the long-felt need.

SUMMARY OF THE INVENTION

The present invention contrives to solve the disadvantages of the prior art.

An aspect of the invention provides a ladder with stabilizer.

The ladder comprises a pair of side rails, a plurality of fixed rung portions, and a first stabilizer.

The first stabilizer is disposed at a side portion of one of the pair of side rails and configured to engage the side portion at two or more positions and provide an additional propping leg portion, stabilizing the ladder.

The first stabilizer comprises an extension bar portion, a main arm portion, a brace bar portion, a pair of teeth strips, and a pair of levers.

The extension bar portion of a shape of elongated angular pipe is enclosed by an outer wall surface, an inner wall surface, and two side wall surfaces, and having an upper end portion and a lower end portion.

The main arm portion of a shape of elongated angular pipe is enclosed by an outer wall surface, an inner wall surface, and two side wall surfaces, having an upper end portion and a lower end portion, and configured so that the lower end portion of the main arm portion is slidably connected to the upper end portion of the extension bar portion through a telescopic connection, and the upper end portion of the main arm portion is connected to the side portion at an upper position through a first hinge.

The brace bar portion has a first end portion and a second end portion, and the first end portion is connected to the side portion at a lower position lower than the upper position through a second hinge, and the second end portion is connected to the extension bar portion at a middle position of the extension bar portion through a third hinge.

The pair of teeth strips are fixed to lower portions of the two side wall surfaces of the main arm portion.

Each of the pair of levers has a latching end and a releasing end, installed on the two side wall surfaces of the extension bar through two spring-loaded hinges, so that the latching end engages the teeth strip through a through-hole provided through the side wall surface of the extension bar portion, holding the telescopic connection in place with variant lengths.

The length from the upper end portion of the main arm portion to the lower end portion of the extension bar portion is adjusted correspondingly to an angle between the side portion and the main arm portion, so as to be configured that the lower end portion of the extension bar portion makes a secure contact with a floor portion.

The extension bar portion may have a cross-section comprises inner and outer wall portions, a pair of first vertical wall portions, a pair of horizontal wall portions, and a pair of second vertical wall portions.

The inner wall portion forms the inner wall surface, and the outer wall portion forms the outer wall surface having a substantially same width as a width of the inner wall portion.

The pair of first vertical wall portions extend vertically from both end portions of the inner wall portion.

The pair of horizontal wall portions extend inwards horizontally from both end portions of the pair of first vertical wall portions.

The pair of second vertical wall portions extend vertically from both end portions of the pair of horizontal wall portions up to the outer wall portion.

An outer T-shaped cross-sectional gap portion may be defined by the inner and outer wall portions, the first and second vertical wall portions, and the horizontal wall portions.

The main arm may have a cross-section comprising an inner wall portion forming the inner wall surface, an outer wall portion forming the outer wall surface having a width narrower than a width of the inner wall portion, a pair of first vertical wall portions extending vertically from two middle positions between both end portions of the inner wall portion, a pair of horizontal wall portions extending inwards horizontally from both end portions of the pair of first vertical wall portions, and a pair of second vertical wall portions extending vertically from both end portions of the pair of horizontal wall portions up to two middle positions between both end portions of the outer wall portion.

An inner T-shaped cross-sectional gap portion may be defined by the inner and outer wall portions, the first and second vertical wall portions, and the horizontal wall portions.

The extension bar portion and the main arm portion may be configured so that the main arm portion is inserted into the inner T-shaped cross-sectional gap portion of the extension bar portion slidably for the telescopic connection.

Each of the pair of teeth strip may comprise a plurality of teeth and a plurality of grooves provided between neighboring teeth and each of the plurality of grooves is configured to receive and engage the latching end of a corresponding lever.

The spring-loaded hinge may comprise a hinge pin, a pair of hinge holes, a pair of spacers, and a spring.

The hinge pin is configured to be inserted through a hinge through-hole provided between the latching end and the releasing end.

The pair of hinge holes are provided on a corresponding side wall surface of the extension bar portion and configured to receive and support the hinge pin.

The pair of spacers are queued through the hinge pin and disposed on both sides of the corresponding lever and the corresponding side wall surface of the extension bar portion.

The spring is installed over the hinge pin, the releasing end of the corresponding lever, and the corresponding side wall surface of the extension bar portion, so that the latching end of the corresponding lever is forced to engage and latch the corresponding teeth strip without a force applied to the releasing end.

The first hinge may comprise a first hinge bracket having two bracket holes and configured to be fixed to the side portion, a pair of spacers having a center hole and disposed on both sides of the upper end portion of the main arm portion, and a hinge pin configured to queue the two bracket holes and the pair of spacers and connect the upper end portion of the main arm to the first hinge bracket.

The second hinge may comprise a second hinge bracket having two bracket holes and configured to be fixed to the side portion, a pair of spacers having a center hole and disposed on both sides of the first end portion of the brace bar portion, and a hinge pin configured to queue the two bracket holes and the pair of spacers and connect the first end portion of the brace bar to the second hinge bracket.

The ladder stabilizer may further comprise an endcap configured to be installed at the upper end portion of the main arm portion.

The ladder stabilizer may further comprise a rubber foot configured to be installed at the lower end portion of the extension bar for making a secure contact with the floor portion.

The first stabilizer may be configured to be deployed at an angle from zero (0) degree to a specific maximum angle, and the specific maximum angle may be determined by a length of the brace bar and locations of the first, second, and third hinges.

The ladder may further comprise a second ladder stabilizer installed to another side portion of one of the pair of side rails.

The second ladder stabilizer may have a structure same as the first ladder stabilizer.

The advantages of the present invention are:

(1) the ladder with stabilizer according to the invention provides a very stable ladder;

(2) the ladder stabilizer can be applied to regular ladders with minimized modification; and (3) the ladder stabilizer according to the invention may be provided separately commercially.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIGS. 9 and 10 are teeth strips of the stabilizer of FIG. 2 according to an embodiment of the invention.

FIGS. 11 and 12 are perspective views of a lever of the stabilizer assembly of FIG. 2 according to still another embodiment of the invention.

FIGS. 13 and 14 are perspective views of a brace bar of the stabilizer of FIG. 2 according to an embodiment of the invention.

FIG. 15 is a cross-sectional view of the brace bar of FIGS. 13 and 14 according to an embodiment of the invention.

FIGS. 16 and 17 are perspective views of upper or lower bracket of the stabilizer of FIG. 2 according to an embodiment of the invention.

FIG. 18 is a perspective view of a spacer of the stabilizer of FIG. 2 according to an embodiment of the invention.

FIG. 19 is a perspective view of a spring of the stabilizer of FIG. 2 according to an embodiment of the invention.

DETAILED DESCRIPTION EMBODIMENTS OF THE INVENTION

An object of the present invention is to provide a ladder with stabilizer or a ladder stabilizer. The ladder stabilizer may be provided separately and independently from the ladder. For the ladder stabilizer may be applied easily to conventional ladders.

Figure 1:
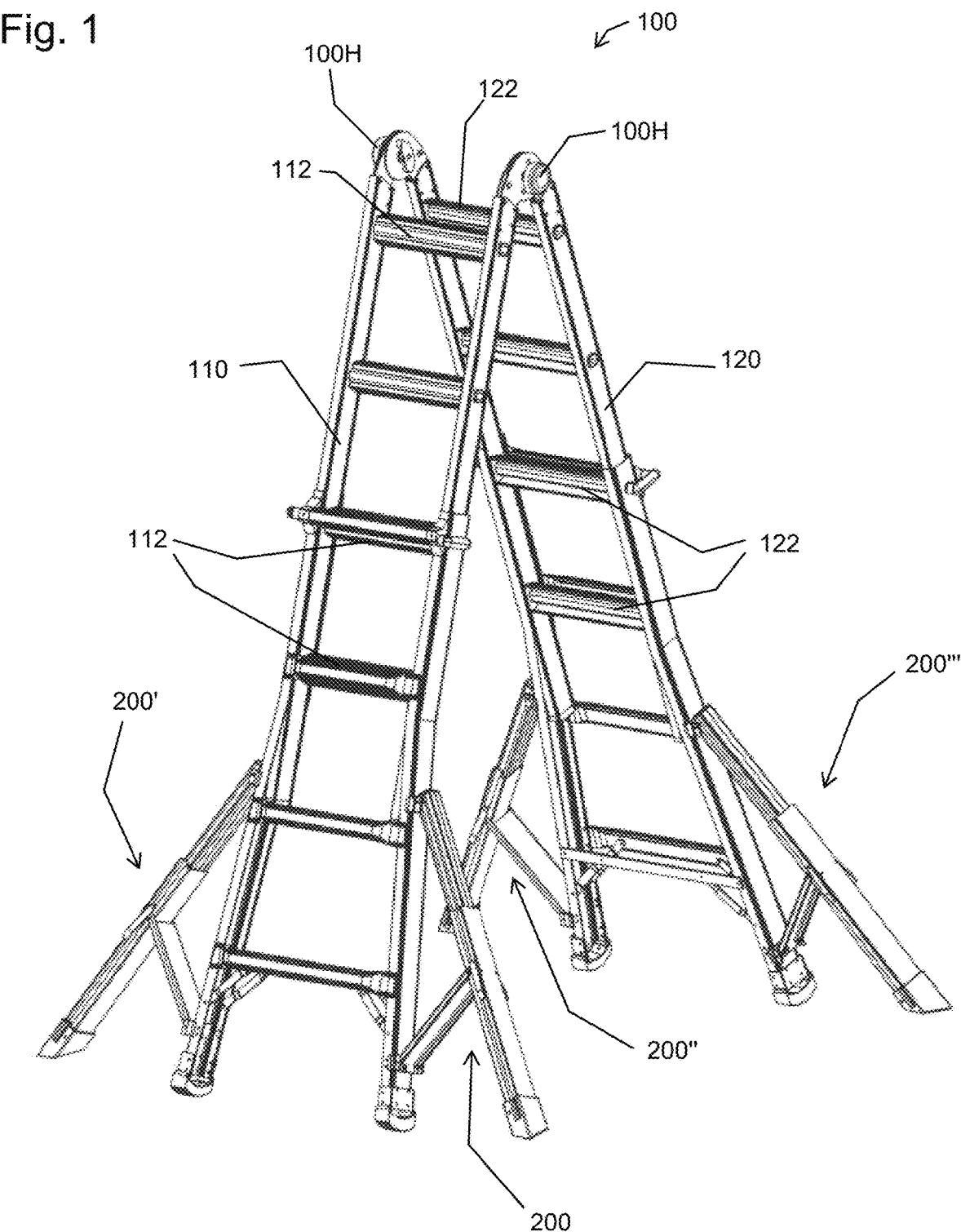
FIG. 1 is a perspective view showing a ladder with four stabilizers according to an embodiment of the invention.

An aspect of the invention provides a ladder (100) with stabilizer (200) as shown in FIG. 1.

The ladder (100) comprises a pair of front side rails (110), a pair of rear side rails (120), a plurality of front fixed rung portions (112), a plurality of rear fixed rung portions (122), and a first stabilizer (200).

The pair of front side rails (110) may comprise top portions and bottom portions, and corresponding top and bottom portions are slidably connected in a telescopic manner. However, each of the pair of front side rails may be provided as a single rail without any telescopic connection. The pair of rear side rails (120) may comprise top portions and bottom portions, and corresponding top and bottom portions are slidably connected in a telescopic manner. Likewise, each of the pair of rear side rails may be provided as a single rail without any telescopic connection.

The plurality of front fixed rung portions (112) is disposed between the pair of front side rails (110), and the plurality of rear fixed rung portions (122) is disposed between the pair of rear side rails (120).

The first stabilizer (200) is disposed at a side portion of one of the pair of front side rails or the pair of rear side rails, and configured to engage the side portion at two or more positions and provide an additional propping leg portion, stabilizing the ladder.

Figure 2:
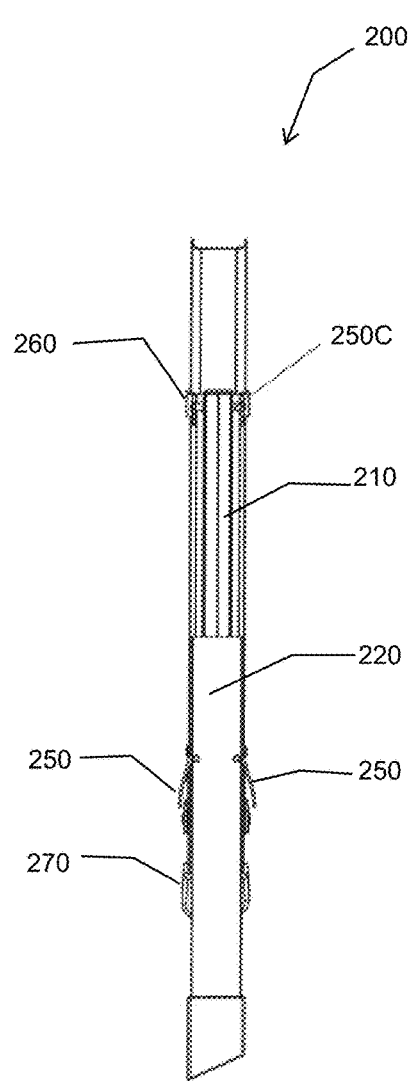
FIG. 2 is a front view showing a stabilizer according to an embodiment of the invention.
Figure 3:
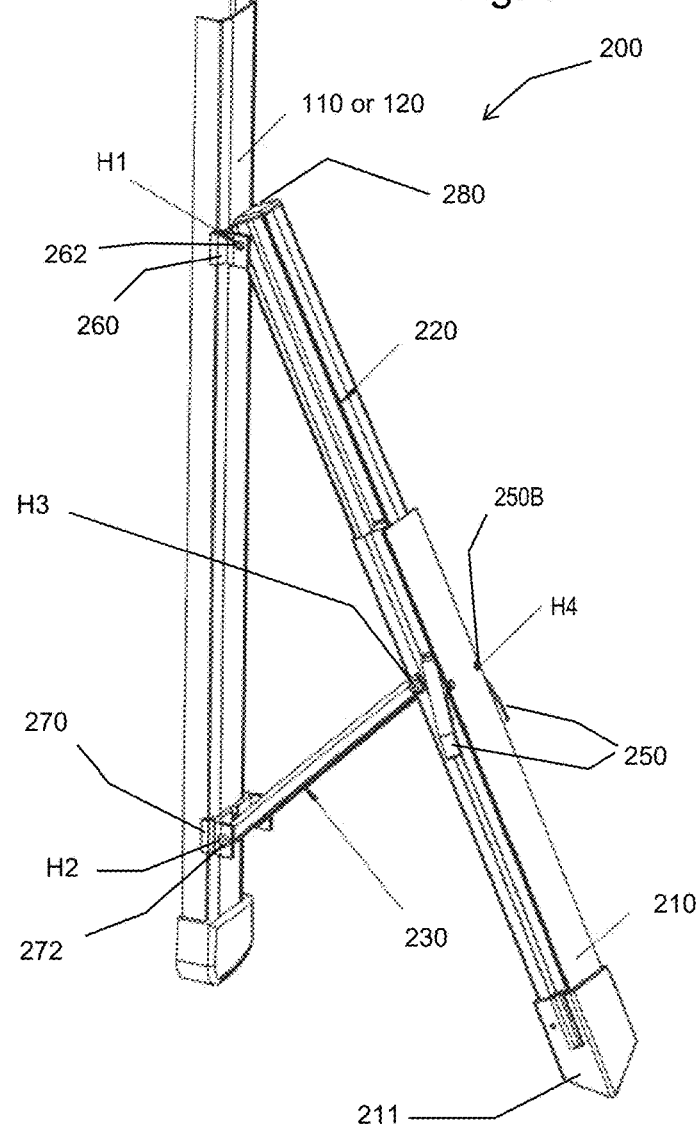
FIG. 3 is a perspective view of the stabilizer of FIG. 2 according to an embodiment of the invention.
Figure 4:
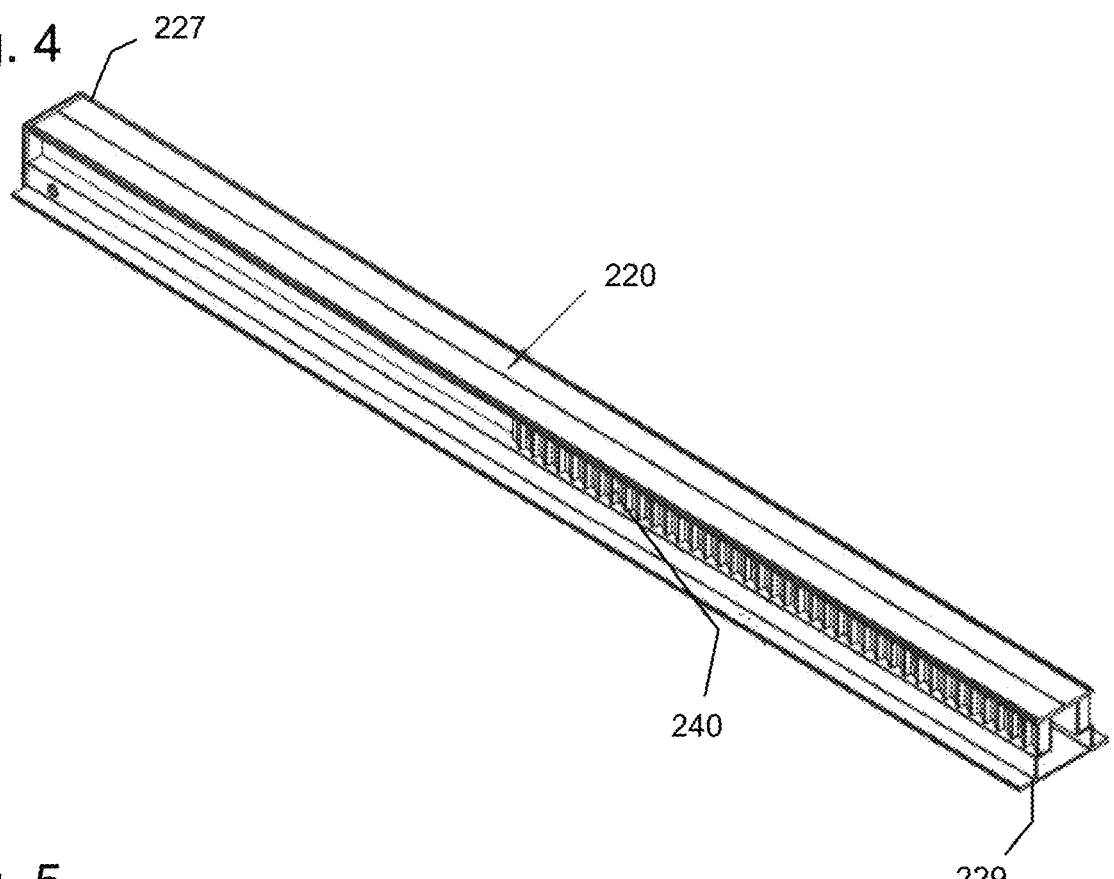
FIG. 4 is a perspective view of a main arm assembly of the stabilizer of FIG. 2 according to an embodiment of the invention.

The first stabilizer (200) comprises an extension bar portion (210), a main arm portion (220), a brace bar portion (230), a pair of teeth strips (240), and a pair of levers (250) as shown in FIGS. 2-4.

The extension bar portion (210) of a shape of elongated angular pipe (see FIG. 8) is enclosed by an outer wall surface (212), an inner wall surface (214), and two side wall surfaces (216), and having an upper end portion (217) and a lower end portion (219).

Figure 22:
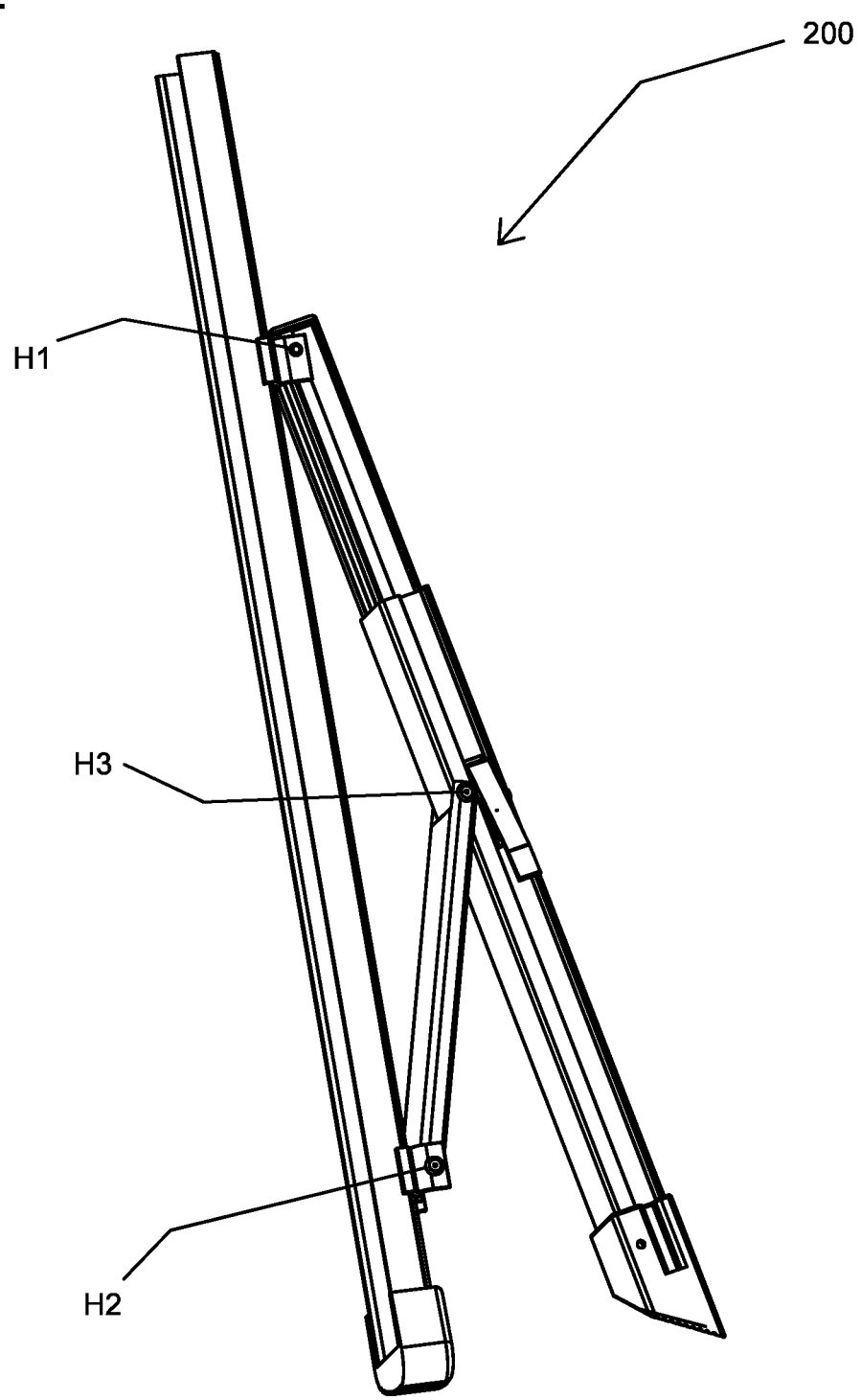
FIG. 22 is another perspective view of the stabilizer of FIG. 2 in a deployed state according to an embodiment of the invention.
Figure 23:
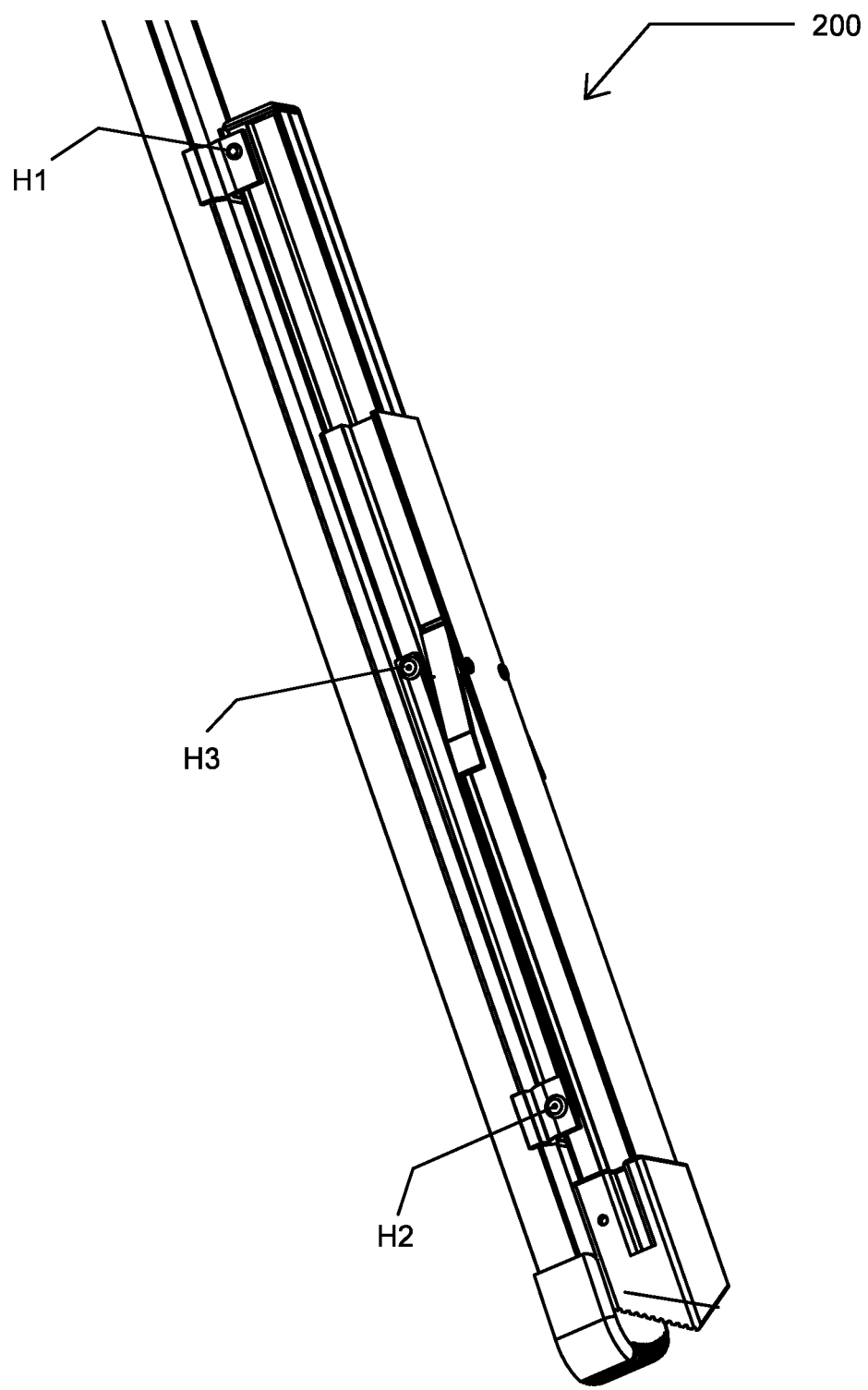
FIG. 23 is still another perspective view of the stabilizer of FIG. 2 in a folded state according to an embodiment of the invention.

The main arm portion (220) of a shape of elongated angular pipe (see FIG. 5) is enclosed by an outer wall surface (222), an inner wall surface (224), and two side wall surfaces (226), having an upper end portion (227) and a lower end portion (229), and configured so that the lower end portion (229) of the main arm portion (220) is slidably connected to the upper end portion (217) of the extension bar portion (210) through a telescopic connection, and the upper end portion (227) of the main arm portion (220) is connected to the side portion of the front or rear side rails (110, 120) at an upper position through a first hinge (H1) as shown in FIGS. 3 and 22-23.

The brace bar portion (230) has a first end portion (232) and a second end portion (234), and the first end portion (232) is connected to the side portion of the front or rear side rails (110, 120) at a lower position lower than the upper position of the first hinge (H1) through a second hinge (H2), and the second end portion (234) is connected to the extension bar portion (210) at a middle position of the extension bar portion (210) through a third hinge (H3) as shown in FIGS. 3, 13-14, and 22-23.

Figure 5:
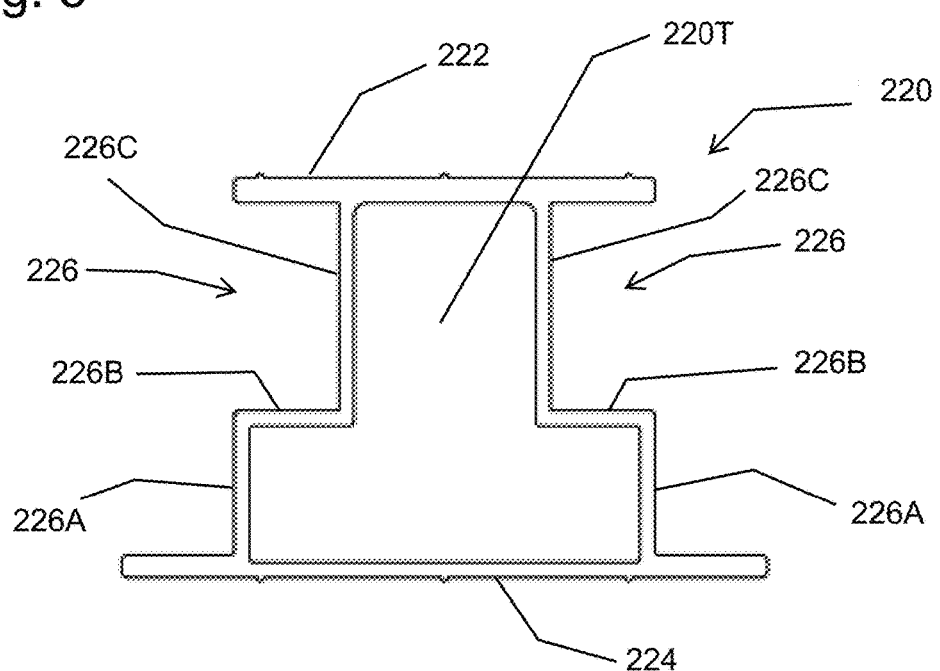
FIG. 5 is a cross-sectional view of the main arm of FIG. 4 according to an embodiment of the invention.

The pair of teeth strips (240) are fixed to lower portions of the two side wall surfaces (226) of the main arm portion (220) as shown in FIGS. 4-5 and 9-10. As shown in the illustrated embodiment, the side wall surface (226) may have a step structure and the teeth strip (240) may be fixed to the inner side wall surface as shown in FIGS. 4-5.

Each of the pair of levers (250) has a latching end (252) and a releasing end (254), installed on the two side wall surfaces of the extension bar (210) through two spring-loaded hinges (H4) provided through a pin hole (256), so that the latching end (252) engages the teeth strip (240) through a through-hole (218) provided through the side wall surface of the extension bar portion (210), holding the telescopic connection in place with variant lengths as shown in FIGS. 6-7, 11-12, and 20-21.

Figures 6, 7:
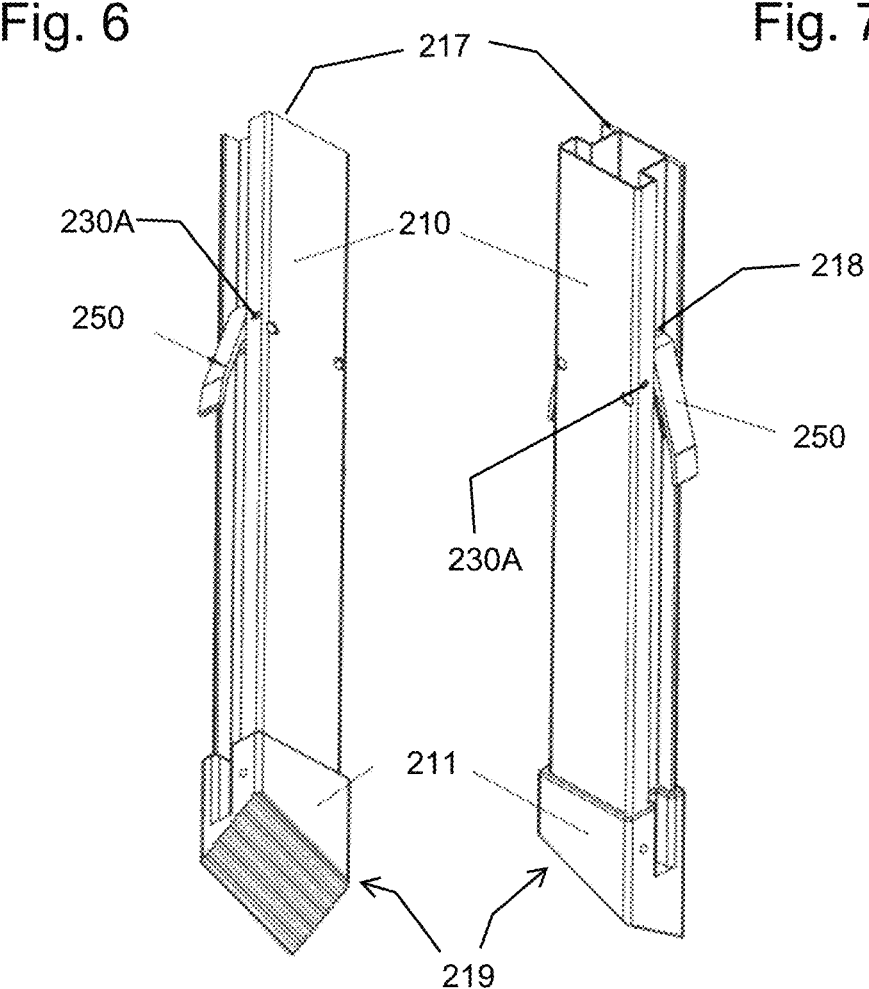
FIGS. 6 and 7 are perspective views of an extension bar assembly of the stabilizer of FIG. 2 according to an embodiment of the invention.

The length from the upper end portion (227) of the main arm portion (220) to the lower end portion (219) of the extension bar portion (210) is adjusted correspondingly to an angle between the side portion of the front or rear side rails (110, 120) and the main arm portion (220), so as to be configured that the lower end portion (219) of the extension bar portion (210) makes a secure contact with a floor portion. The lower end portion (219) may further comprise a foot (211) as shown in FIGS. 3 and 6-7.

Figure 8:
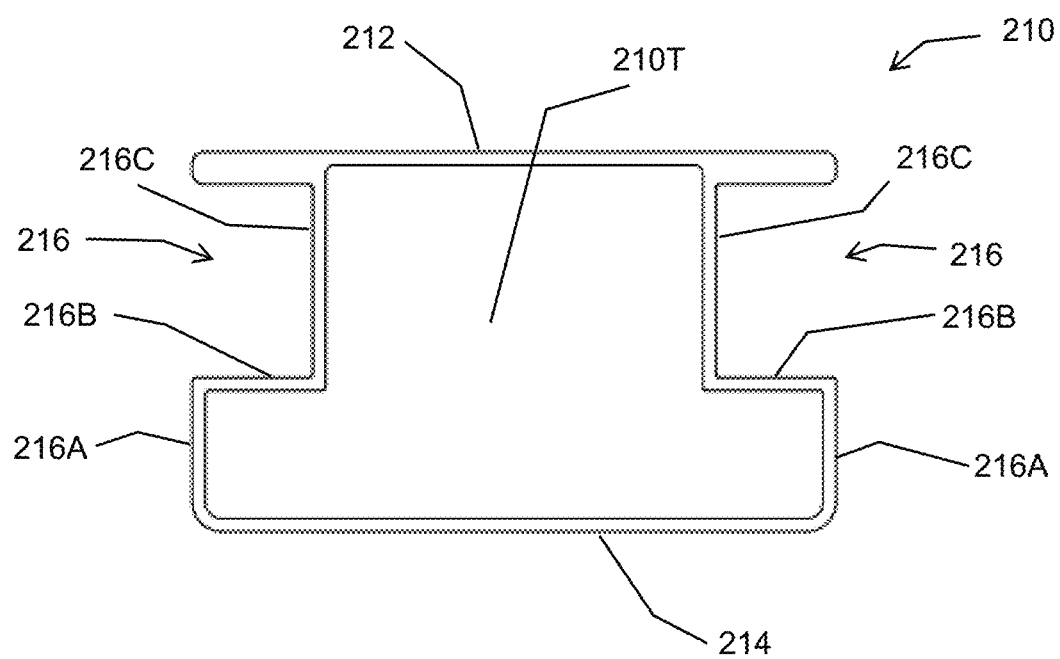
FIG. 8 is a cross-sectional view of an extension bar of FIGS. 6 and 7 according to an embodiment of the invention.
Figure 20:
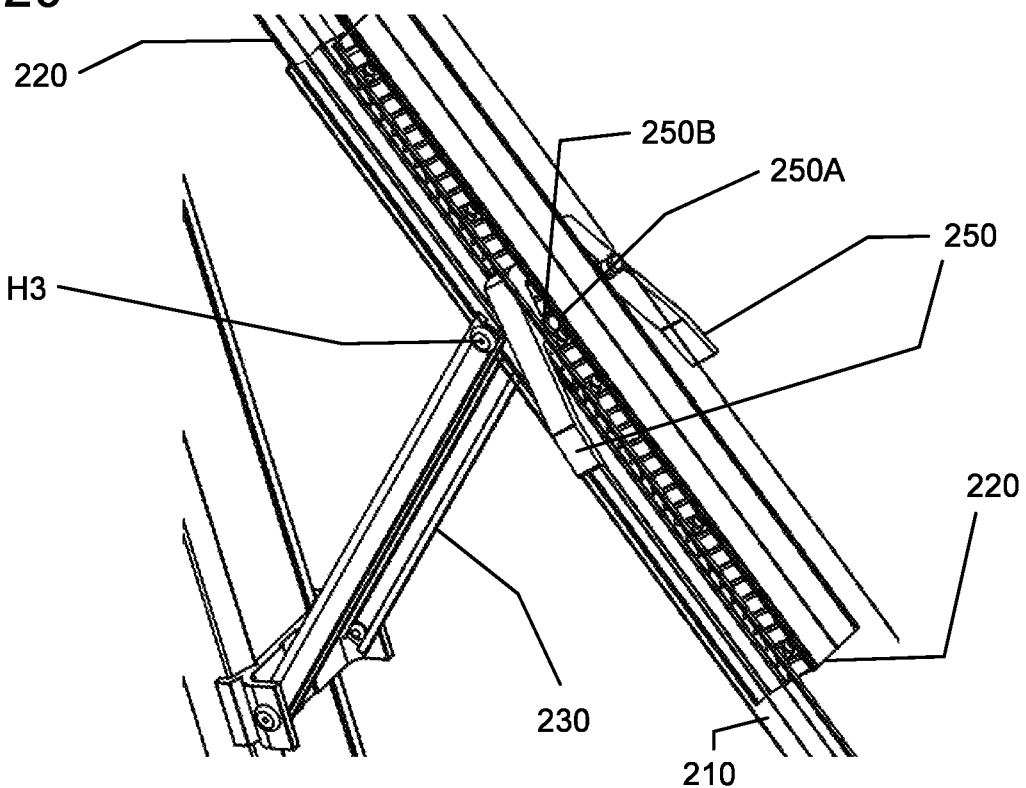
FIG. 20 is a partial perspective view of the stabilizer of FIG. 2 according to an embodiment of the invention.
Figure 21:
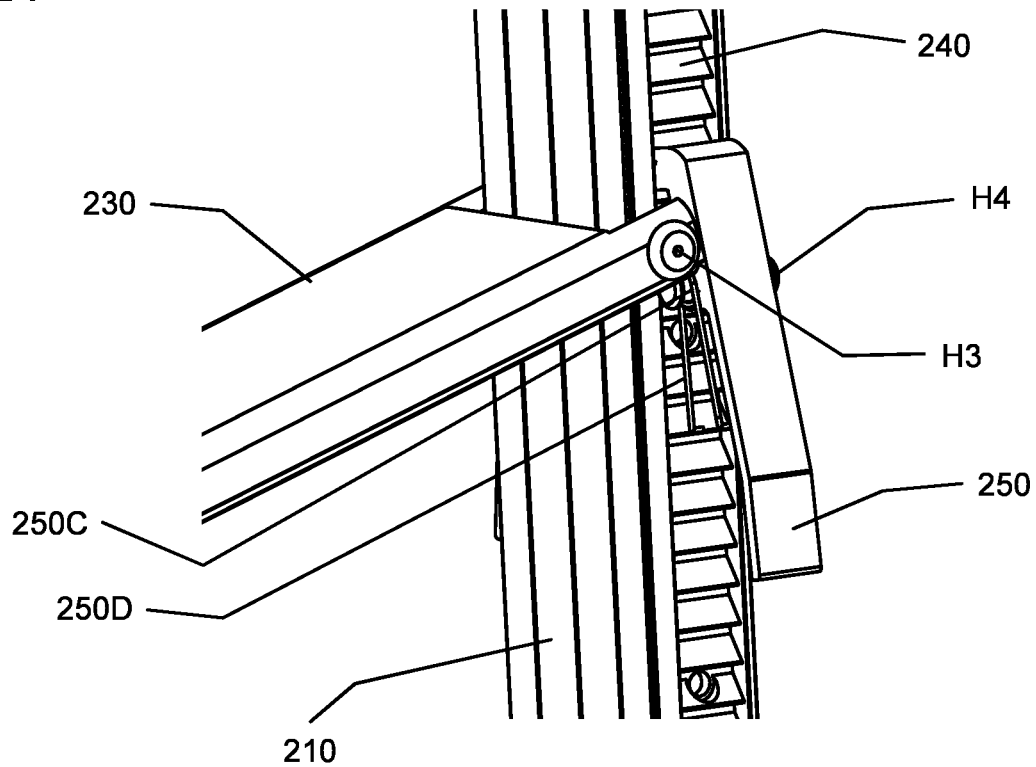
FIG. 21 is a partial perspective view of FIG. 20.

The extension bar portion (210) may have a cross-section comprises inner and outer wall portions (214, 212), a pair of first vertical wall portions (216A), a pair of horizontal wall portions (216B), and a pair of second vertical wall portions (216C) as shown in FIG. 8.

The inner wall portion (214) forms the inner wall surface, and the outer wall portion (212) forms the outer wall surface having a substantially same width as a width of the inner wall portion (214).

The pair of first vertical wall portions (216A) extend vertically from both end portions of the inner wall portion (214).

The pair of horizontal wall portions (216B) extend inwards horizontally from both end portions of the pair of first vertical wall portions (216A).

The pair of second vertical wall portions (216C) extend vertically from both end portions of the pair of horizontal wall portions (216B) up to the outer wall portion (212).

An outer T-shaped cross-sectional gap portion (210T) may be defined by the inner and outer wall portions (212, 214), the first and second vertical wall portions (216A, 216C), and the horizontal wall portions (216B).

As shown in FIG. 5, the main arm (220) may have a cross-section comprising an inner wall portion (224) forming the inner wall surface, an outer wall portion (222) forming the outer wall surface having a width narrower than a width of the inner wall portion, a pair of first vertical wall portions (226A) extending vertically from two middle positions between both end portions of the inner wall portion (224), a pair of horizontal wall portions (226B) extending inwards horizontally from both end portions of the pair of first vertical wall portions (226A), and a pair of second vertical wall portions (226C) extending vertically from both end portions of the pair of horizontal wall portions (226B) up to two middle positions between both end portions of the outer wall portion (222).

An inner T-shaped cross-sectional gap portion (220T) may be defined by the inner and outer wall portions (224, 222), the first and second vertical wall portions (226A, 226C), and the horizontal wall portions (226B).

The extension bar portion (210) and the main arm portion (220) may be configured so that the main arm portion (220) is inserted into the inner T-shaped cross-sectional gap (210T) portion of the extension arm portion (210) slidably for the telescopic connection as shown in FIGS. 3, 20, and 22-23. In particular, in FIG. 20, a portion of the extension arm portion (210) is shown in a transparent form, in order to show the main arm portion (220) inserted into the extension arm portion (210). Of course, it does not matter if the extension arm portion (210) is transparent or not.

Each of the pair of teeth strip (240) may comprise a plurality of teeth and a plurality of grooves provided between neighboring teeth and each of the plurality of grooves is configured to receive and engage the latching end (252) of a corresponding lever (250) as shown in FIGS. 9-10 and 20-21.

The spring-loaded hinge (H4) may comprise a hinge pin (250A), a pair of hinge holes (250B), a pair of spacers (250C), and a spring (250D).

The hinge pin (250A) is configured to be inserted through a hinge through-hole (256) provided between the latching end (252) and the releasing end (254).

The pair of hinge holes (250B) are provided on the outer surface (212) and the horizontal surface (216B) of the extension bar portion and configured to receive and support the hinge pin (250A) as shown in FIGS. 3, 6-8, 11, and 20-21.

The pair of spacers (250C) are queued through the hinge pin (250A) and disposed on both sides of the corresponding lever (250) and the corresponding side wall surface of the extension bar portion.

The spring (250D) is installed over the hinge pin (250A), the releasing end (254) of the corresponding lever (250), and the corresponding side wall surface (216) of the extension bar portion (210), so that the latching end (252) of the corresponding lever (250) is forced to engage and latch the corresponding teeth strip (240) without a force applied to the releasing end (254).

The first hinge (H1) may comprise a first hinge bracket (260) having two bracket holes (262H) and configured to be fixed to the side portion of the front or rear side rails (110, 120), a pair of spacers (250C) having a center hole and disposed on both sides of the upper end portion of the main arm portion, and a hinge pin (262) configured to queue the two bracket holes and the pair of spacers and connect the upper end portion (227) of the main arm (220) to the first hinge bracket (260) as shown in FIGS. 2-4 and 16-18.

The second hinge (H2) may comprise a second hinge bracket (270) having two bracket holes (272H) and configured to be fixed to the side portion of the front or rear side rails (110, 120), a pair of spacers (250C) having a center hole and disposed on both sides of the first end portion (232) of the brace bar portion (230), and a hinge pin (272) configured to queue the two bracket holes (272H) and the pair of spacers (250C) and connect the first end portion (232) of the brace bar (230) to the second hinge bracket (270) as shown in FIGS. 2-3, 13-14, 16-18, and 20-21.

The first and second brackets (260, 270) do not have the same dimension, but can accommodate the situation and other neighboring components.

The ladder (100) or the stabilizer (200) may further comprise an endcap (280) configured to be installed at the upper end portion (227) of the main arm portion (220) as shown in FIG. 3.

The ladder (100) or the stabilizer (200) may further comprise a rubber foot (211) configured to be installed at the lower end portion (219) of the extension bar (210) for making a secure contact with the floor portion.

The first stabilizer (200) may be configured to be deployed at an angle from zero (0) degree to a specific maximum angle, and the specific maximum angle may be determined by a length of the brace bar (230) and locations of the first, second, and third hinges (H1, H2, H3).

The ladder (100) may further comprise a second ladder stabilizer (200') installed to another side portion of one of the pair of front side rails or the pair of rear side rails.

Figure 24:
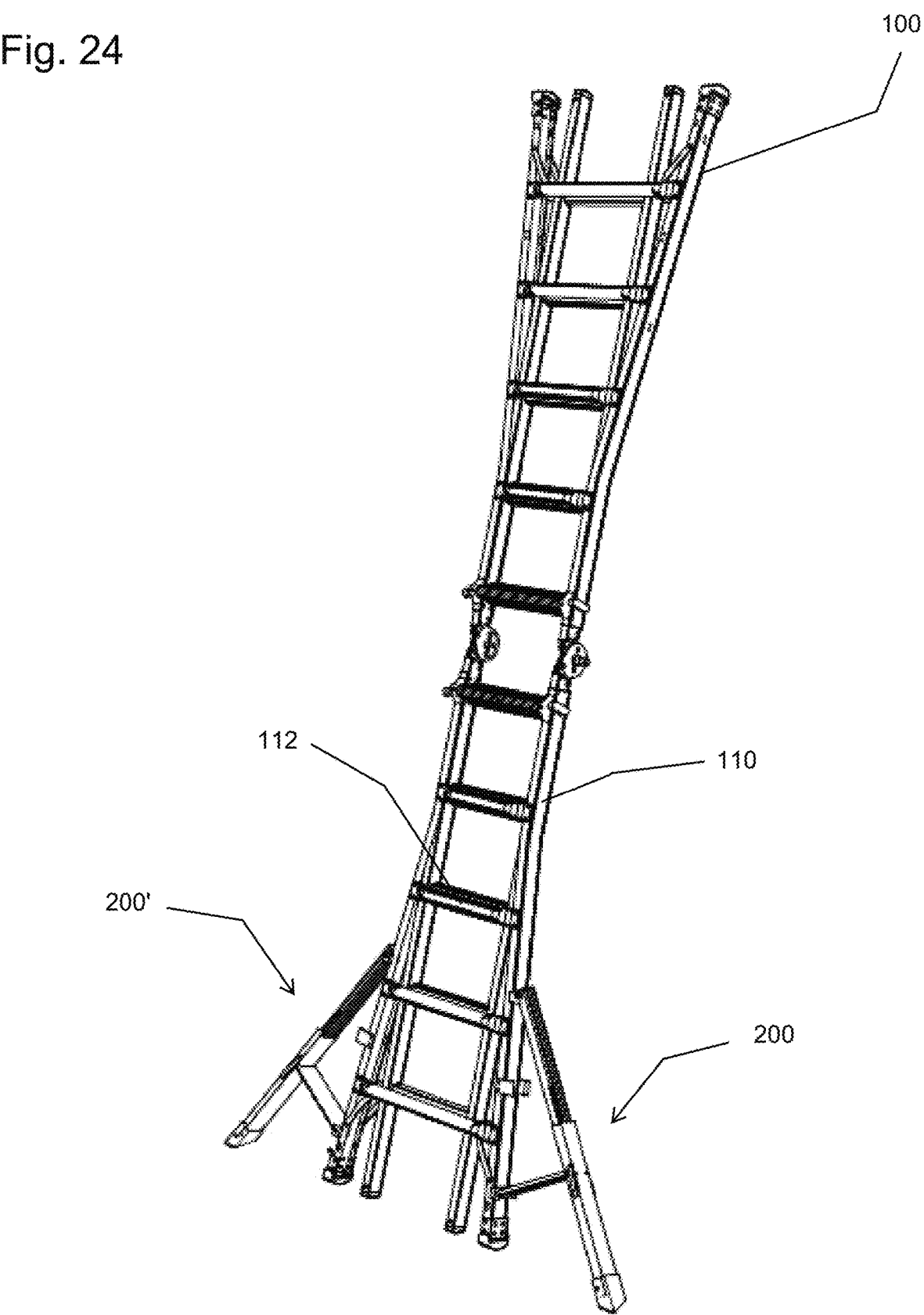
FIG. 24 is a perspective view showing a ladder with two stabilizers according to another embodiment of the invention.

The second ladder stabilizer may have a structure same as the first ladder stabilizer as shown in FIGS. 1 and 24.

Also, the ladder (100) may still further comprise third and fourth ladder stabilizers (200", 200'") as shown in FIG. 1.

An aspect of the invention provides a ladder (100) with stabilizer (200) as shown in FIG. 24.

The ladder (100) comprises a pair of side rails (110), a plurality of fixed rung portions (112), and a first stabilizer (200).

The plurality of fixed rung portions (112) is disposed between the pair of side rails (110).

The first stabilizer (200) is disposed at a side portion of one of the pair of side rails, and configured to engage the side portion at two or more positions and provide an additional propping leg portion, stabilizing the ladder.

The first stabilizer (200) comprises an extension bar portion (210), a main arm portion (220), a brace bar portion (230), a pair of teeth strips (240), and a pair of levers (250) as shown in FIGS. 2-4.

The rest of the illustrated embodiment is same as the embodiment shown in FIG. 1.

The ladder stabilizer (200) may be applied to any kind of ladders as shown in FIGS. 1 and 24.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A ladder having a pair of side rails and a stabilizer, wherein the stabilizer comprises of:
   an extension bar portion defined by an outer wall surface, an inner wall surface, and two side wall surfaces, and having an upper end portion and a lower end portion;
   a main arm portion defined by an outer wall surface, an inner wall surface, and two side wall surfaces, having an upper end portion and a lower end portion, and configured so that the lower end portion of the main arm portion is slidably connected to the upper end portion of the extension bar portion through a telescopic connection, wherein the upper end portion of the main arm portion is connected to a side portion of a respective side rail of the pair of side rails at an upper position of the respective side rail of the pair of side rails through a first hinge;
   a brace bar portion having a first end portion and a second end portion, wherein the first end portion is connected to the side portion at a lower position of the respective side rail of the pair of side rails lower than the upper position of the respective side rail of the pair of side rails through a second hinge, and the second end portion is connected to the extension bar portion at a middle position of the extension bar portion through a third hinge;
   a pair of teeth strips fixed to lower portions of the two side wall surfaces of the main arm portion; and a pair of levers, each of which having a latching end and a releasing end, installed on the two side wall surfaces of the extension bar portion through two spring-loaded hinges, so that the latching end engages a respective teeth strip of the pair of the teeth strips through a through-hole provided through a respective side wall surface of the two side wall surfaces of the extension bar portion, holding the telescopic connection in place with variant lengths, wherein a length from the upper end portion of the main arm portion to the lower end portion of the extension bar portion is adjusted correspondingly to an angle between the side portion of a respective side rail of the pair of side rails and the main arm portion, so as to be configured that the lower end portion of the extension bar portion makes a secure contact with a floor portion, and
   wherein the stabilizer is disposed at the side portion of a respective side rail of the pair of side rails, stabilizing the ladder;
   wherein the extension bar portion has a cross-section comprising:
   an inner wall portion forming the inner wall surface of the extension bar portion;
   an outer wall portion forming the outer wall surface of the extension bar portion having a substantially same width as a width of the inner wall portion;
   a pair of first vertical wall portions extending vertically from two end portions of the inner wall portion;
   a pair of horizontal wall portions extending inwards horizontally from an end portion of each vertical wall portion of the pair of first vertical wall portions; and
   a pair of second vertical wall portions extending vertically from an end portion of each horizontal wall portion of the pair of horizontal wall portions up to the outer wall portion, wherein an outer T-shaped cross-sectional gap portion is defined by the inner and outer wall portions, the first and second vertical wall portions, and the horizontal wall portions.

2. The ladder having a pair of side rails and the stabilizer of claim 1, wherein the main arm portion has a cross-section comprising:
   an inner wall portion forming the inner wall surface of the main arm portion;
   an outer wall portion forming the outer wall surface of the main arm portion having a width narrower than a width of the inner wall portion;
   a pair of first vertical wall portions extending vertically from two middle positions between both end portions of the inner wall portion;

a pair of horizontal wall portions extending inwards horizontally from both end portions of the pair of first vertical wall portions; and a pair of second vertical wall portions extending vertically from both end portions of the pair of horizontal wall portions up to two middle positions between both end portions of the outer wall portion, wherein an inner T-shaped cross-sectional gap portion is defined by the inner and outer wall portions, the first and second vertical wall portions, and the horizontal wall portions, and wherein the extension bar portion and the main arm portion are configured so that the main arm portion is inserted into the first T-shaped cross-sectional gap portion of the extension arm portion slidably for the telescopic connection.

3. The ladder having a pair of side rails and the stabilizer of claim 1, wherein each of the pair of teeth strips comprises a plurality of teeth and a plurality of grooves provided between neighboring teeth and each of the plurality of grooves is configured to receive and engage the latching end of a corresponding lever.

4. The ladder having a pair of side rails and the stabilizer of claim 1, wherein at least one of the two spring-loaded hinges comprises:
  a hinge pin configured to be inserted through a hinge through-hole provided between the latching end and the releasing end;
  a pair of spacers queued through the hinge pin and disposed on both sides of a corresponding lever and a corresponding side wall surface of the extension bar portion; and
  a spring installed over the hinge pin, the releasing end of the corresponding lever, and the corresponding side wall surface of the extension bar portion, so that the latching end of the corresponding lever is forced to engage and latch the respective teeth strip without a force applied to the releasing end.

5. The ladder having a pair of side rails and the stabilizer of claim 1, wherein the first hinge comprises:
  a first hinge bracket having two bracket holes and configured to be fixed to the side portion;
  a pair of spacers having a center hole and disposed on both sides of the upper end portion of the main arm portion; and
  a hinge pin configured to queue the two bracket holes and the pair of spacers and connect the upper end portion of the main arm portion to the first hinge bracket.

6. The ladder having a pair of side rails and the stabilizer of claim 1, wherein the second hinge comprises:
  a second hinge bracket having two bracket holes and configured to be fixed to the side portion;
  a pair of spacers having a center hole and disposed on both sides of the first end portion of the brace bar; and
  a hinge pin configured to connect the first end portion of the brace bar to the second hinge bracket.

7. The ladder having a pair of side rails and the stabilizer of claim 1, further comprising an endcap configured to be installed at the upper end portion of the main arm portion.

8. The ladder having a pair of side rails and the stabilizer of claim 1, further comprising a rubber foot configured to be installed at the lower end portion of the extension bar portion for making a secure contact with the floor portion.

9. The ladder having a pair of side rails and the stabilizer of claim 1, wherein the stabilizer is configured to be deployed at an angle from zero (0) degree to a specific maximum angle, and wherein the specific maximum angle is determined by a length of the brace bar and locations of the first, second, and third hinges.

10. The ladder having a pair of side rails and the stabilizer of claim 1, wherein the ladder comprises:
  a plurality of fixed rung portions disposed between the pair of side rails.

11. A ladder having a pair of front side rails, a pair of rear side rails, and a stabilizer; wherein the stabilizer comprises of:
  an extension bar portion defined by an outer wall surface, an inner wall surface, and two side wall surfaces, and having an upper end portion and a lower end portion;
  a main arm portion defined by an outer wall surface, an inner wall surface, and two side wall surfaces, having an upper end portion and a lower end portion, and configured so that the lower end portion of the main arm portion is slidably connected to the upper end portion of the extension bar portion through a telescopic connection, wherein the upper end portion of the main arm portion is connected to a side portion of a respective side rail of the pair of front and rear side rails at an upper position of the respective side rail of the pair of front and rear side rails through a first hinge;
  a brace bar portion having a first end portion and a second end portion, wherein the first end portion is connected to the side portion at a lower position of the respective side rail of the pair of front and rear side rails lower than the upper position of the respective side rail of the pair of front and rear side rails through a second hinge, and the second end portion is connected to the extension bar portion at a middle position of the extension bar portion through a third hinge;
  a pair of teeth strips fixed to lower portions of the two side wall surfaces of the main arm portion; and a pair of levers, each of which having a latching end and a releasing end, installed on the two side wall surfaces of the extension bar portion through two spring-loaded hinges, so that the latching end engages a respective teeth strip of the pair of the teeth strips through a through-hole provided through a respective side wall surface of the two side wall surfaces of the extension bar portion, holding the telescopic connection in place with variant lengths, wherein a length from the upper end portion of the main arm portion to the lower end portion of the extension bar portion is adjusted correspondingly to an angle between the side portion of a respective side rail of the pair of front and rear side rails and the main arm portion, so as to be configured that the lower end portion of the extension bar portion makes a secure contact with a floor portion, and
  wherein the stabilizer is disposed at the side portion of a the respective side rail of the pair of front and rear side rails, stabilizing the ladder;
  wherein the extension bar portion has a cross-section comprising:
  an inner wall portion forming the inner wall surface of the extension bar portion;
  an outer wall portion forming the outer wall surface of the extension bar portion having a substantially same width as a width of the inner wall portion;
  a pair of first vertical wall portions extending vertically from two end portions of the inner wall portion;
  a pair of horizontal wall portions extending inwards horizontally from an end portion of each vertical wall portion of the pair of first vertical wall portions; and a pair of second vertical wall portions extending vertically from an end portion of each horizontal wall portion of the pair of horizontal wall portions up to the outer wall portion, wherein an outer T-shaped cross-sectional gap portion is defined by the inner and outer wall portions, the first and second vertical wall portions, and the horizontal wall portions a plurality of front fixed rung portions disposed between the pair of front side rails;

a plurality of rear fixed rung portions disposed between the pair of rear side rails.

12. The ladder of claim 11 further comprising:

a second stabilizer disposed at a side portion of a second one of the pair of front and rear side rails to provide an additional propping leg portion, stabilizing the ladder.

* * * * *